(12) United States Patent
Arnold et al.

(10) Patent No.: US 8,619,992 B2
(45) Date of Patent: *Dec. 31, 2013

(54) SECURE KEY CREATION

(71) Applicant: International Business Machines Corporation, Armonk, NY (US)

(72) Inventors: Todd W. Arnold, Charlotte, NC (US); Elizabeth A. Dames, Concord, NC (US); Carsten D. Frehr, Farum (DK); Kenneth B. Kerr, New Paltz, NY (US); Richard V. Kisley, Charlotte, NC (US); Eric D. Rossman, Wappingers Falls, NY (US); Eric B. Smith, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,768

(22) Filed: Oct. 11, 2012

(65) Prior Publication Data

US 2013/0034228 A1  Feb. 7, 2013

Related U.S. Application Data

(63) Continuation of application No. 13/095,226, filed on Apr. 27, 2011.

(51) Int. Cl.
*H04L 9/08* (2006.01)
*H04L 9/30* (2006.01)

(52) U.S. Cl.
CPC ... *H04L 9/08* (2013.01); *H04L 9/30* (2013.01); *H04L 9/083* (2013.01)
USPC ........................................................ 380/277

(58) Field of Classification Search
USPC .......................................................... 380/277
See application file for complete search history.

(56) References Cited

U.S. PATENT DOCUMENTS

| 4,941,176 A | 7/1990 | Matyas et al. |
| 5,661,803 A | 8/1997 | Cordery et al. |
| 6,104,810 A * | 8/2000 | DeBellis et al. ................ 380/43 |
| 7,660,421 B2 | 2/2010 | Hopkins et al. |
| 8,254,571 B1 * | 8/2012 | Boyen ............................ 380/44 |

(Continued)

OTHER PUBLICATIONS

Baldwin, A.; Shiu, S., "Encryption and key management in a SAN," Security in Storage Workshop, 2002. Proceedings. First International IEEE, pp. 35,44, Dec. 11, 2002.*

(Continued)

*Primary Examiner* — Luu Pham
*Assistant Examiner* — Nelson Giddins
(74) *Attorney, Agent, or Firm* — Cantor Colburn LLP; Steven Chiu

(57) ABSTRACT

Creating a secure key includes creating a token and populating a key control information section of the token with a value to indicate a minimum number of key parts used to form a key. Creating the secure key also includes populating a payload section of the token with a first key part, binding the key control information section to the payload section, adding a second key part to the first key part and iterating the value and binding the key control information section to the payload section after the second key part has been added. Creating the secure key further includes indicating the key is complete, wherein the key comprises a combination of the first and second key parts.

10 Claims, 7 Drawing Sheets

(56) References Cited

U.S. PATENT DOCUMENTS

| | | |
|---|---|---|
| 2003/0163433 A1 | 8/2003 | Lam et al. |
| 2003/0210791 A1 | 11/2003 | Binder |
| 2004/0001595 A1 | 1/2004 | Hopkins et al. |
| 2004/0039925 A1 | 2/2004 | McMillan et al. |
| 2004/0052377 A1 | 3/2004 | Mattox et al. |
| 2006/0002549 A1* | 1/2006 | Avasarala et al. ............... 380/44 |
| 2006/0177066 A1 | 8/2006 | Han et al. |
| 2006/0242407 A1 | 10/2006 | Kimmel et al. |
| 2006/0265338 A1 | 11/2006 | Rutkowski et al. |
| 2007/0014399 A1 | 1/2007 | Scheidt et al. |
| 2007/0127722 A1 | 6/2007 | Lam et al. |
| 2007/0160201 A1 | 7/2007 | Blom et al. |
| 2007/0189541 A1 | 8/2007 | Lam et al. |
| 2007/0204158 A1 | 8/2007 | Hatashita et al. |
| 2007/0217613 A1 | 9/2007 | Lam et al. |
| 2008/0046732 A1 | 2/2008 | Fu et al. |
| 2008/0065888 A1 | 3/2008 | Zheng et al. |
| 2008/0070577 A1 | 3/2008 | Narayanan et al. |
| 2008/0209221 A1 | 8/2008 | Vennelakanti et al. |
| 2008/0298589 A1 | 12/2008 | Katar et al. |
| 2009/0106551 A1 | 4/2009 | Boren et al. |
| 2010/0158247 A1* | 6/2010 | Hopkins et al. ............... 380/44 |
| 2011/0156873 A1 | 6/2011 | Choi et al. |

OTHER PUBLICATIONS

Maughan et al., "RFC 2408—Internet Security Association and Key Management Protocol (ISAKMP)", Nov. 1998, The Internet Society.*
U.S. Appl. No. 13/047,344, filed Mar. 14, 2011.
U.S. Appl. No. 13/095,226, filed Apr. 27, 2011.
U.S. Appl. No. 13/100,354, filed May 4, 2011.
U.S. Appl. No. 13/100,357, filed May 4, 2011.
U.S. Appl. No. 13/100,639, filed May 4, 2011.
U.S. Appl. No. 13/100,693, filed May 4, 2011.
U.S. Appl. No. 13/047,344, filed Mar. 14, 2011; Non-Final Office Action dated Dec. 7, 2012; 9 pages.
U.S. Appl. No. 13/095,226, filed Apr. 27, 2011; Non-Final Office Action dated Feb. 11, 2013; 36 pages.
U.S. Appl. No. 13/100,354, Non-Final Office Action dated Dec. 4, 2012; 33 pages.
U.S. Appl. No. 13/100,357, Non-Final Office Action dated Dec. 5, 2012; 10 pages.
U.S. Appl. No. 13/047,344, filed Mar. 14, 2011; Final Office Action dated Mar. 29, 2013; 14 pages.
U.S. Appl. No. 13/100,354, Final Office Action dated Mar. 27, 2013; 37 pages.
U.S. Appl. No. 13/100,639, filed May 4, 2011; Final Office Action dated Apr. 4, 2013; 14 pages.
U.S. Appl. No. 13/100,639, filed May 4, 2011; Non-Final Office Action dated Oct. 1, 2012; 15 pages.

* cited by examiner

| 402 | 404 | 406 | 408 | 410 | 412 |
|---|---|---|---|---|---|
| Key Material State | Wrapping KVP Type | Wrapping KVP Value | Wrapping Method | Hash Method | Reserved |

Content example for AESKW wrapped payload:

| | |
|---|---|
| 602 | Integrity Check Constant |
| 604 | Bit Length of Padding |
| 606 | Length of Hash Options |
| 608 | Hash Options |
| 610 | Hash of AD |
| 612 | Clear Key Material |
| 614 | Key padding |

600

SECURE KEY CREATION

CROSS-REFERENCE TO RELATED APPLICATION

The present disclosure is a continuation of U.S. patent application Ser. No. 13/095,226, entitled "SECURE KEY CREATION," filed on Apr. 27, 2011, which is incorporated herein by reference in its entirety.

BACKGROUND

The present invention relates to data processing, and more specifically, to cryptography methods to enhance security of keys.

Layouts for secure data structures, called tokens, are used to contain secret key material and may also include descriptors of the token contents. A technique for enhanced security may include requiring multiple parties in order to access a complete and usable key. Implementation of systems with multiple parties may rely on rules and human intervention to ensure that the key is properly completed.

SUMMARY

According to one embodiment, a method for creating a secure key is provided. The method includes creating a token and populating a key control information section of the token with a value to indicate a minimum number of key parts used to form a key. The method also includes populating a payload section of the token with a first key part, binding the key control information section to the payload section, adding a second key part to the first key part and iterating the value and binding the key control information section to the payload section after the second key part has been added. The method further includes indicating the key is complete, wherein the key comprises a combination of the first and second key parts.

BRIEF DESCRIPTION OF THE SEVERAL VIEWS OF THE DRAWINGS

FIG. 6 depicts a block diagram of a payload section of the token of FIG. 2.

DETAILED DESCRIPTION

Exemplary embodiments of the invention provide for the secure management of key material (also called "keys") comprised of one or more key parts. Embodiments may use a token (also called "key tokens") or other suitable device for key material management. An exemplary token is a data structure that can hold a complete or partial cryptographic key along with a key's management and usage information associated with the key. The exemplary embodiments create and utilize sections within a token to perform various tasks including management of the key and assembly of a key made of more than one key part. Moreover, the management information includes information relating to the total number of key parts and an indicator, such as a counter, to indicate the number of key parts currently combined. The management information is bound to the key material within the token and is re-bound to the secure key material after each key part is added to the key material. Key management includes methods and systems for generating, exchanging, using, storing and destroying keys.

Figure 1:
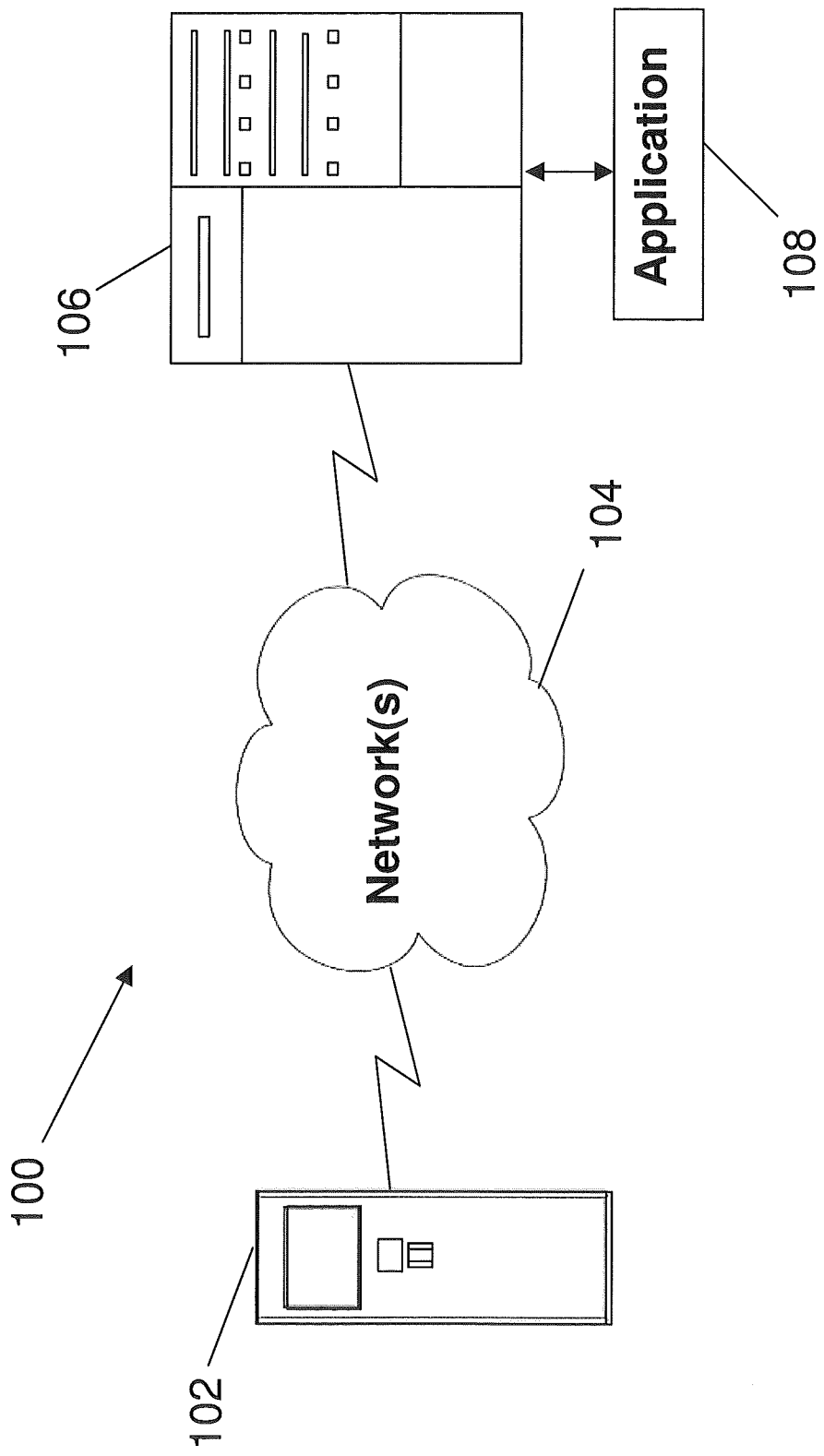
FIG. 1 depicts a block diagram of a system upon which secure key management methods may be implemented in an exemplary embodiment.
Figure 2:
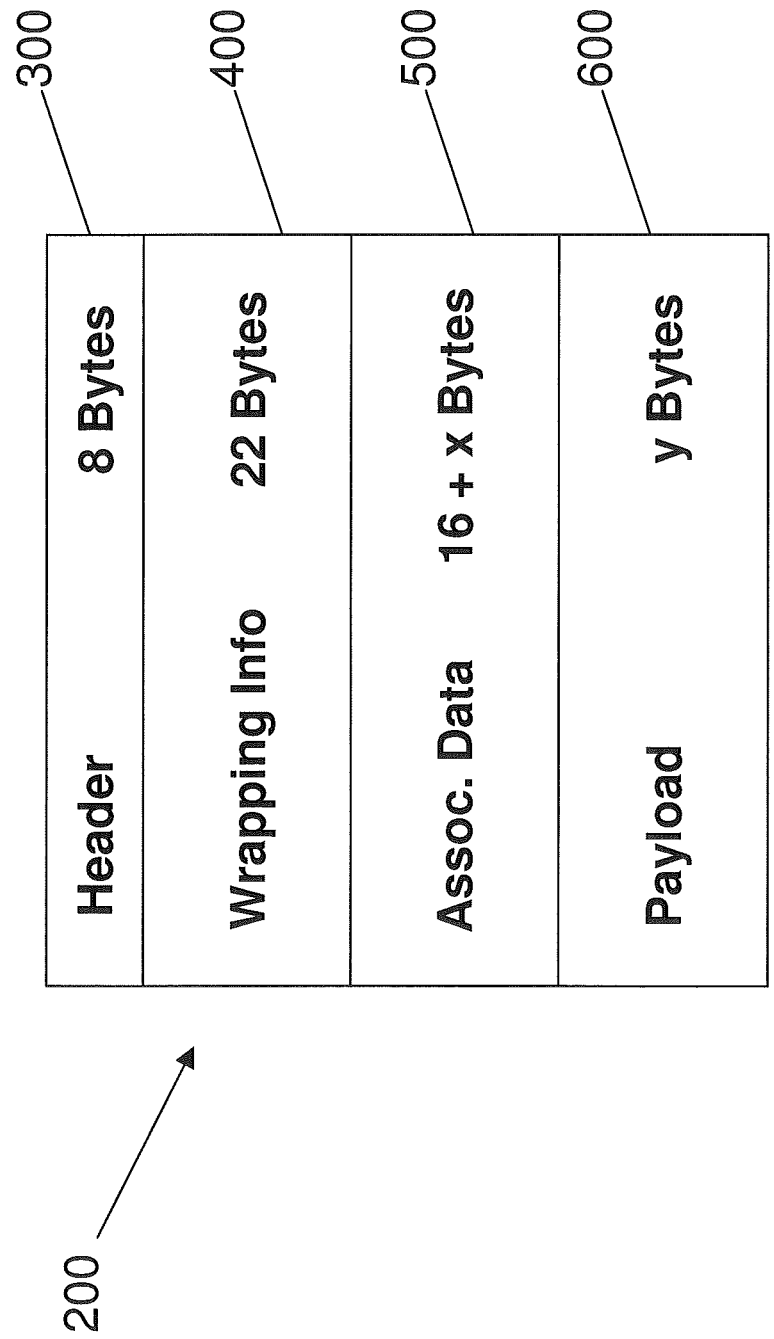
FIG. 2 depicts a block diagram of a token or data structure to manage key material.

With reference now to FIGS. 1 and 2, an exemplary system 100 and token 200 for providing secure key management will now be described. The exemplary system 100 creates, uses and/or transmits key tokens and/or key material. The system of FIG. 1 includes a user system 102 in communication over one or more networks 104 with a host system 106. The user system 102 represents a first party that submits key material to be communicated to a second party (e.g., the host system 106). The user system 102 may be a point of sale (POS) terminal that is implemented using a computer executing a computer program for carrying out the processes described herein. The user system 102 may include a hardware security module (HSM), such as a card, software and firmware configured to create, populate and manage the token 200 containing the key material as described herein. An HSM may be described as a piece of hardware and associated software/firmware that acts as a highly secure peripheral device, or secure cryptoprocessor, for the management of cryptographic keys and for the protection of sensitive data and applications.

In the depicted embodiment, an application 108 is used by the HSM on the host system 106 to create, populate and manage the token 200. The user system 102 may be a payment terminal, such as an automated teller machine (ATM) or kiosk, configured to receive user information, such as account information or account PIN. The host system 106 may be a financial institution connected to the user system 102 via one or more of the network(s) 104. The key material resides in a token in storage within the host system 106. The financial institution receives encrypted data from the terminal user system 102 over the network 104, which may include an account number and PIN information. Then the application 108 retrieves the key material from local storage and passes it into the HSM along with the received encrypted data. Inside the HSM, the token with the key material is unwrapped and the unwrapped key from the token is then used to decrypt the encrypted data from user system 102. The data can then be checked and verified, which is then communicated to the application 108. In one exemplary embodiment, the user system 102 includes hardware and software to execute computer instructions to create the token 200 that securely wraps the key material for local use or for transmission to another party, such as the host system 106. In another exemplary embodiment, the host system 106 executes computer instructions to create the token 200 that securely wraps the key material for local use or for transmission to another party, such as the user system 102.

The network(s) 104 may be any type of known networks including, but not limited to, a wide area network (WAN), a local area network (LAN), a global network (e.g., Internet), a virtual private network (VPN), and an intranet. The network 104 may be implemented using a wireless network or any kind of physical network implementation known in the art. The user system 102 may be coupled to the host system 106 through multiple networks (e.g., intranet and Internet). One or more user systems 102 and the host system 106 may be connected to the network 104 in a wired or wireless fashion.

In one embodiment, the network 104 is an intranet and one or more user systems 102 execute a user interface application (e.g., a web browser) to contact the host system 106 through the network 104. In another exemplary embodiment, one or more of the user systems 102 is connected directly (i.e., not through the network 104) to the host system 106.

The host system 106 depicted in FIG. 1 may be implemented using one or more servers operating in response to a computer program stored in a storage medium accessible by the server. The host system 106 may include one or more hardware security modules (HSMs), such as a card, software and firmware configured to create and manage tokens containing the key material as described herein.

The exemplary secure key management methods and structures may be created and performed by components of the system 100 of FIG. 1.

The token 200 may reside locally on and be created by the host system 106 or user system 102. For example, the user system 102 may include a token 200 containing key material used to encrypt account data to send to the host system 106. In this embodiment, the token 200 is a data structure that includes several sections (e.g., sections 300, 400, 500 and 600) dedicated to selected tasks such as describing the token and key material. A header section 300 includes data used to interpret fields within sections of the token 200. The exemplary header section 300 is a fixed-size section of the token 200. A wrapping information section 400 is also a fixed-size section that contains information pertinent to how (and if) the key material in a payload section 600 is wrapped. The wrapping information section 400 also includes information about how the key material in the payload section 600 is securely bound to the information in an associated data (AD) section 500. The associated data section 500 may also be described as a key control information section, wherein the section contains fields configured to store various types of information, such as a user-defined data to be associated with the key material. The associated data section 500 is a variable-size section that has a small fixed-size portion with some descriptive fields for the key material itself, along with length fields for the variable-size portions of this section.

The payload section 600 is where the key material resides in a selected state. In an example, there are three states, including (1) not present, (2) clear and (3) encrypted/bound. In the not present state, the token is a "skeleton" which contains descriptive and policy information in a useful template that can be populated into a specific token with key material at a later time. The clear state may be used for testing purposes or low security applications, where it is useful to support tokens that have unencrypted key material. In the encrypted/bound state, the key material is accompanied with pre-pended and/or post-pended data (key binding material). The key material and pre-pended or post-pended data conforms to and is wrapped using a supported wrapping method indicated by token fields within the wrapping information section 400. The exemplary token 200 enables wrapping of the token sections via a suitable wrapping method, as described below, without altering the token 200 structure. Specifically, the structure of the header 300, wrapping information 400 and associated data 500 sections will not change based on the chosen wrapping method.

The sections of the exemplary token 200 may have fixed or variable sizes. For example, the header section 300 has the fixed size of 8 bytes and the wrapping information section 400 has the fixed size of 22 bytes. The associated data section 500 has an overall variable size composed of the fixed-size portion of 16 bytes plus a sum of variable-sized other portions of the section. Similarly, the payload section 600 has a variable-size depending on the state of the key material. Exemplary payload sizes include: 0 bits for tokens with no key material; the length of the key itself for unencrypted key material; and the length of the key plus the length of the key binding material for tokens that include encrypted key material.

Figure 3:
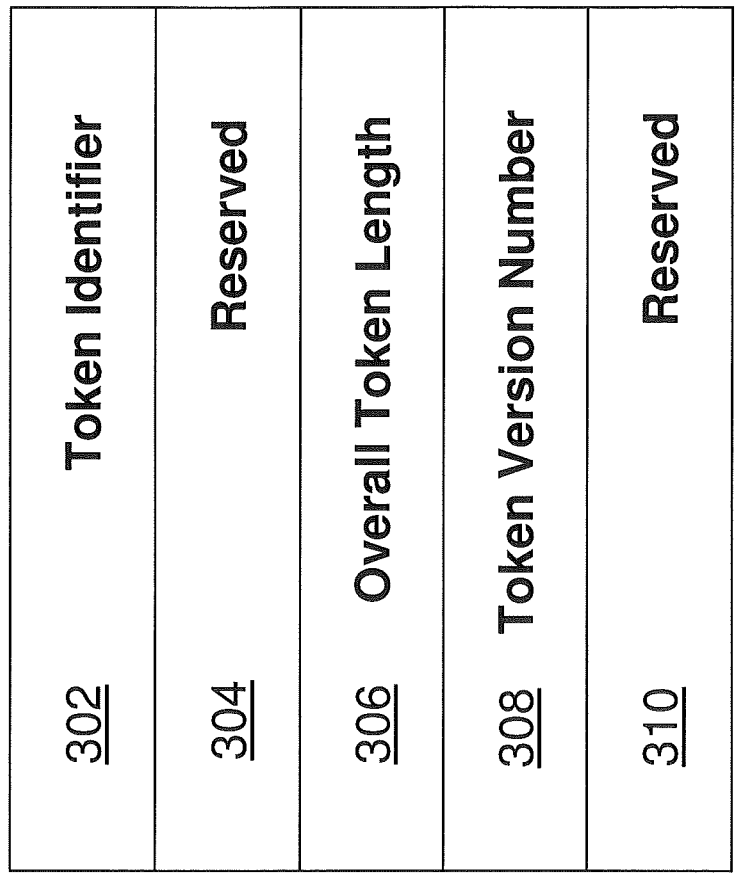
FIG. 3 depicts a block diagram of a header section of the token of FIG. 2.

Turning now to FIG. 3, the exemplary header section 300 of the token 200 will now be described. The header section 300 includes several fields used to describe aspects of the token 200. A token identifier field 302 indicates broad token type information to aid processing of the token 200. Token types that may be listed in the token identifier field include internal tokens for local use, external tokens for sending to another party, or zero token types, depending on usage needs and application requirements. A zero token is typically a placeholder, which may be a string of one or more bytes with all zero bits in the first byte, which is passed into an application program interface in a position that a full token is expected in return. A reserved field 304 is set aside for future use. An overall token length field 306 indicates the entire length of the token 200, including the header section 300. A token version number field 308 describes a version of the token 200, which separates this token from legacy token structure types supported by systems from the same manufacturer as the current system 100. This enables the system 100 to access and use current and legacy token types on the same machines. A reserved field 310 is also set aside for future use.

Figure 4:
FIG. 4 depicts a block diagram of a wrapping information section of the token of FIG. 2.

FIG. 4 shows the exemplary wrapping information section 400 which includes fields to describe how the key material in the payload section 600 is wrapped and secured to the associated data section 500 (key control information). A key material state field 402 describes a state of the key material in the payload section 600. Possible states include: no key present; the key is clear; the key and a representation of the key control information, such as a hash, is encrypted under a Key Encrypting Key (KEK); and the key and a representation of the key control information, such as a hash, is encrypted under the secret Master Key (MK) that stays in the HSM.

In the no key present state, the token is a "skeleton" which contains descriptive and policy information in a useful template that can be populated into a specific token with actual key material at a later time. The clear state is used for testing purposes or low security applications. In the encrypted state of KEK and MK, the key material is wrapped and bound by key binding material. The states available in the key material state field 402 are limited by the token identifier field 302, wherein an external token identifier may have a key material state of no key, a clear key or a KEK encryption. Similarly, an internal token identifier may have a key material state of no key, a clear key or an MK encryption. Accordingly, the KEK key material state is used to send the key material to another party, whereas the MK key material state is used locally by a host application.

With continued reference to FIG. 4, the wrapping key verification pattern (KVP) type field 404 specifies the calculation method, such as a cryptographic hash algorithm (also referred to as "hash algorithm"), to apply to the MK or KEK (as described in key material state field 402) used to wrap the payload field 600. The output of the calculation is then compared to the content of a wrapping KVP value field 406 to verify that the correct key has been identified as wrapping the payload section 600. If the values do not match, then the wrong key has been provided and the user is notified of the error. The KVP type field 404 and wrapping KVP value field 406 are not used if the key material state is no key or clear key.

A wrapping method field 408 is used to describe the payload section 600 wrapping method and how it is bound to the associated data section 500. In an embodiment, the user selects, via the HSM, the wrapping method to use when the token 200 is created. This wrapping method can include the layout of the payload section 600, the logical operations to perform on the key used for encryption, such as KEK or MK, and what steps to do with the key used for encryption to make up the final payload section 600, such as additional encryption steps or operations to bind associated data into the secure payload. The logical operations to perform on the key used for encryption are various steps performed in wrapping the payload section 600. As many as 255 wrapping methods can be described. In one embodiment, four values are assigned to corresponding wrapping methods. Examples of wrapping methods include advanced encryption standard key wrap (AESKW) or a public key encryption scheme that combines algorithms, such as RSAES (Rivest Shamir Adelman Encryption Scheme) with OAEP (Optimal Asymmetric Encryption Padding).

A hash method field 410 describes a hash algorithm applied to the associated data section 500, wherein the resulting hash value is then compared to a stored hash value (field 610) in the payload section 600. This check against the stored value is a mechanism to indicate if the associated data section 500 has been altered. A reserved field 412 is set aside for future use.

Figure 5:
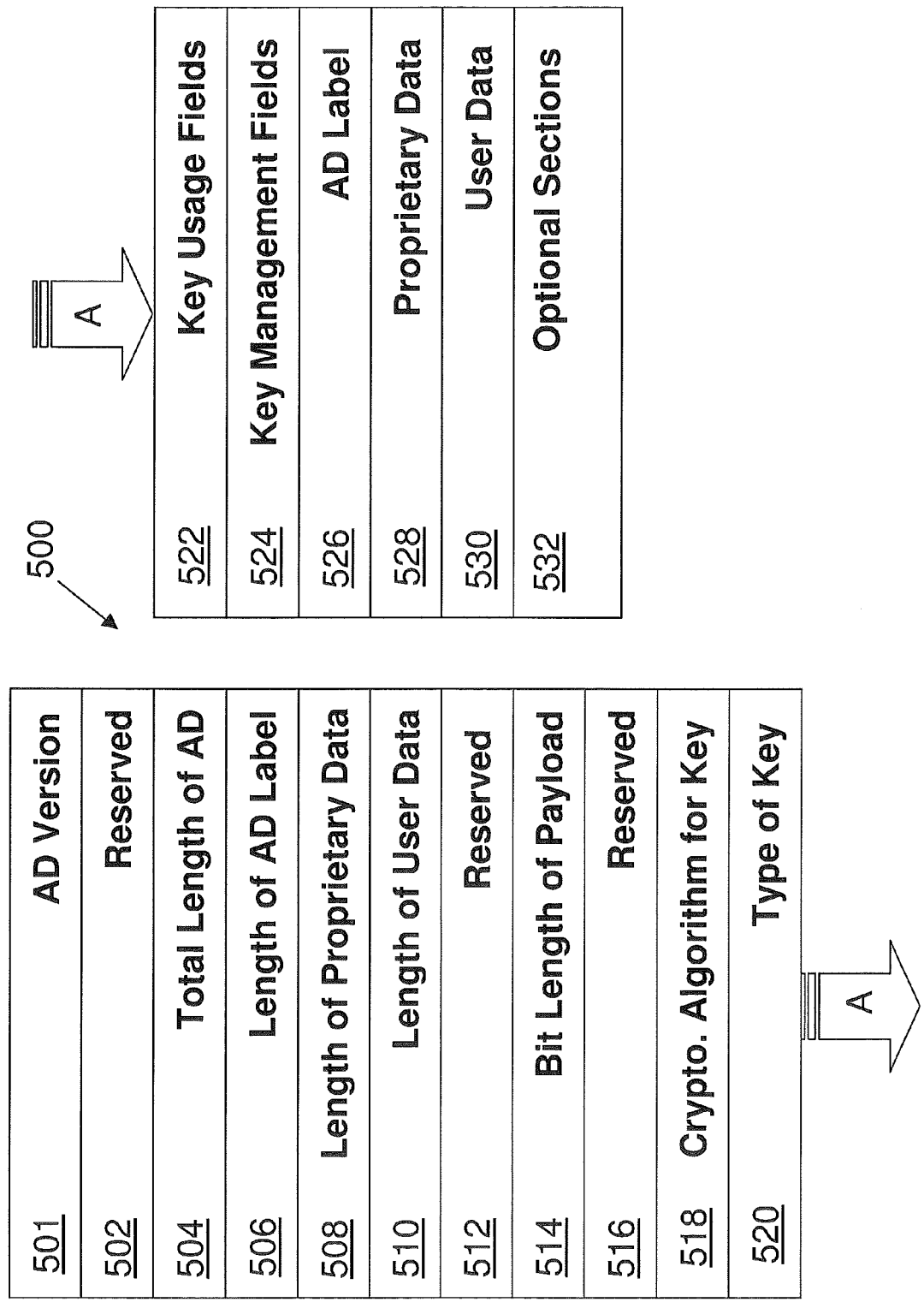
FIG. 5 depicts a block diagram of an associated data section of the token of FIG. 2.

Referring now to FIG. 5, the exemplary associated data (AD) section 500 (also referred to as "key control information section") includes fields for the descriptive fields for the key material and other fields to describe field sizes in this section. An AD version field 501 is used to identify the version of the current AD section 500, thus allowing for future expansion as well as support across multiple versions and layouts. A reserved field 502 is set aside for future use. In addition, reserved fields, in this and other sections, may be utilized to enable alignment of data in the section. A total length of AD field 504 describes the size of the AD section 500, thereby enabling the section to vary in size. A length of AD label field 506 describes the size of an optional AD label field 526 that is passed by the user. In an example, this field gives the label length in bytes wherein the length is either 64 or 0. A length of proprietary data field 508 describes a length in bytes of an extensible proprietary data field 528 (0-255) contained in the AD where the data is placed by the manufacturer of the HSM (either where the token is created or currently resides), such as control and tracking data outside the other data fields. A length of user data field 510 describes the size of an extensible user data field 530, wherein the user can populate the variable length field (0-255 bytes) via a provided interface, such as an API for the system. A reserved field 512 is set aside for future use.

A bit length of payload field 514 describes the length of the payload section 600 in bits, which is important for certain wrapping methods used to protect the payload. A reserved field 516 is set aside for future use. A cryptographic algorithm for key field 518 indicates which supported cryptographic algorithm can be used with the encrypted key material in the payload. Examples of the algorithm include those used with the following standards: AES, data encryption standard (DES), RSA, Elliptic Curve and message authentication code (MAC). A type of key field 520 defines the categories for use of the key material with the algorithm from field 518. Categories of use are broad and include cipher key, importer KEK, exporter KEK, and MAC. Key usage fields (KUFs) 522 are a variable length and extensible field or set of fields that define narrower attributes for the key type defined in 520. Exemplary attributes in the key usage fields 522 describe how the key material can be used and/or limits actions that may be performed in various situations available for this key type. For example, if the key material is an AES key for importing or exporting other keys, it can be used as a wrapping key for exporting other AES keys from this HSM or as an unwrapping key to import other AES keys into this HSM. In another example, if the key material is a cipher key, the key usage fields 522 can further limit key material use to enciphering or deciphering. A plurality of usage description fields may be placed in the set of key usage fields 522. Accordingly, the key usage fields 522 vary in size and interpretation based on other fields, including fields 518 and 520. The exemplary key usage fields 522 are in the following format—one byte: count of fields that follow this byte; two bytes each: fields with key usage fields data.

Still referring to FIG. 5, key management fields (KMFs) 524 are a variable length and extensible field or set of fields that define attributes for the key material wrapped in the token, including but not limited to what type of KEKs can be used to wrap this key material (if any), and whether the wrapped key material is complete or expects more user contributed material. As discussed in further detail with reference to FIG. 7, user contributed material may include additional key parts or a completion step configured to make the key operable. Other examples of attributes include limiting what can be done to the key material, such as limiting distribution or export of the key material, such as a cipher key, after receipt of the key material by a party. The number of attributes or entries in the key management fields 524 is variable. The key management fields 524 vary in size and interpretation based on other fields, including fields 518 and 520. The exemplary key management fields 524 are in the following format—one byte: count of fields that follow this byte; two bytes each: fields with key management fields data. Exemplary key management fields 524 include fields that allow user policies to be implemented to manage the entire key material life cycle and are extensible to register key history and policies for the remaining life cycle. For example, the fields allow updating of life cycle information after receiving the key material. Further, policies may be created after receipt to specify when the key material is to be retired or allowable methods for wrapping the key material itself.

As discussed above, the AD label field 526 is a user specified optional field that gives a meaningful name to the token 200. An exemplary AD label field 526 is 64 bytes. The label is within the token 200, thereby enabling recovery of the label via field 526. Further, the AD label field is securely bound to the key material due to being wrapped as part of the AD section 500 with the key material. In addition, since the label is unencrypted, it can be used by the host system to check if the user is authorized to use the key token. The proprietary data field 528 is for the HSM provider to include their own data or identifiers, which will be securely bound to the key material if an appropriate wrapping method is selected. The user data field 530 is for user populated data and may hold data as designated by the HSM-using host application. Accordingly, the user populates the data using an interface on a host application. The optional sections fields 532 allow for further extensibility of the token 200 at the discretion of the HSM-using host application or the HSM manufacturer. Each optional section field is in the format of unique identifier, length (must include length of identifier and length fields) and an optional data section.

Referring now to FIG. 6, the exemplary payload section 600 may have no content, or not be wrapped (key material is here by itself and is not encrypted). If the payload section 600 contains wrapped content then fields 408 and 410 can be used to interpret the payload contents and the method for using the appropriate KEK or MK to unwrap the payload. As stated above, the payload section 600 layout depends on the wrapping method chosen, such as AESKW or RSAES-OAEP wrapping methods. Moreover, the structure and layout of the header section 300, wrapping information section 400, associated data section 500 and payload section 600 are independent and remain the same as the wrapping method for the token 200 and payload section 600 are changed. As an example, the AESKW wrapping method and corresponding payload layout will be described.

The integrity check constant value field 602 includes a known constant that is used to determine if the unwrap succeeded before looking at other fields in the section. If the constant is not correct then the payload or its associated data were corrupted or modified in some way outside the control of the HSM. The corruption or modification is then alerted to the user. A bit length of padding field 604 is used to describe if there is padding and the size of padding, depending on the bit length of the key material in the payload. Thus, this field indicates how much padding to remove. A length of hash options field 606 describes the length of a hash options field 608. The hash options field 608 describes various options that may be used in computing the hash of AD field 610, while still conforming to the AESKW standard. The hash of AD 610 is the hash value of the AD section 500, used to verify that the section has not been altered. A clear key material field 612 contains the key material or secret key that is carried in the payload section 600. A key padding field 614 is used to pad the key material and depends on the size of the key material in field 612.

In embodiments, the key in the token 200 is comprised of more than one key part. Each key part may be controlled by a separate user, wherein each user provides their key part to complete the key. In an example, any individual key part does not provide any information as to what the complete key is. Therefore, by having separate key parts and corresponding separate users, security for key usage is enhanced. In the multi-key part arrangement, no single user or entity may have access to the complete key. In embodiments, a security officer sets rules for creation and assembly of keys for systems utilizing a secure module, such as an HSM, to manage the key. For example, the security officer of an institution may establish a rule that each key created is comprised of at least one, two, three or more parts. The officer may also create another rule that a completed key requires the input of a minimum number of users (e.g., one, two, three or more users) who may or may not contribute key parts, depending on the application. The system and token 200 bind the information relating to creation of keys and key parts to the secure key, thereby providing current information about the key assembly during assembly.

The exemplary method provides a key management mechanism which requires a minimum number of entities or users to each provide a separate and confidential key part used to make up a single key. For example, the value for the minimum number of users may be three users, each with their own key part. In other exemplary methods and systems, the minimum number of users and parts may be one, two, three or more. Exemplary methods and tokens do not necessarily limit the total number of key parts of a single key. Instead, a security officer establishes, via this mechanism, a minimum number of key parts and users needed to create a key in the HSM. To enhance key security, by using a split knowledge requirement or feature, the key parts are separated or split so that when the parts are combined inside the HSM, the combination yields the complete key. The key parts may be combined in the HSM by any suitable method, such as through the use of an "exclusive-OR" mechanism. In an exemplary embodiment, one or more steps is configured to combine or add key parts and a separate step is configured to make the key complete, wherein the key is operational and functional within the HSM. By implementing a separate step to complete the key after combining all the key parts, the method implements a dual control mechanism, wherein certain users have privileges for certain actions and more than one user is required for completion of the key. As discussed herein, in an embodiment, the same split knowledge mechanism that is used for assembling the key parts is also used to provide the dual-control feature. As part of the dual-control feature, a separately authorized user is required to complete the key (separate from the users who provide the key parts), thus making the key operational and functional.

When a key token is created, the HSM securely and confidentially places the key data provided by the first user into the key token. By using the secure HSM for key creation and updating of related information, operations inside the HSM are secure and confidential. During key creation, the HSM populates the token with key management information 524 ("KMF", FIG. 5) from the first user, including the value for the number of required key parts as well as the mechanism to indicate key completeness. After population of the first key part and key control information by the first user, the HSM maintains this information securely bound in the key token. In an embodiment, the key control information may be in the clear or may be encrypted, but may not be successfully altered outside the HSM.

In an embodiment, each user provides a key part, which is combined by the HSM with any previous key parts in the key token. After each user has provided their clear key parts, the key can be completed. The HSM has a separately authorized user, who does not add any key parts, with access to the system to complete the key. The key completion step causes the HSM to identify that the key is complete, thus making the key operational and functional with the HSM. This final step implements a dual control mechanism for the key. As compared to other embodiments, the method discussed does not rely on working procedures (e.g., rules) or manual steps by users external to the system. Instead, an embodiment uses the HSM to enforce the steps of assembly and dual-control for the creation of a key from key parts. In the embodiment, the minimum number of key parts is chosen for each key on an as-needed basis and may depend on user access determined by the security officer. The number of key parts is determined at the start of each key creation. In an embodiment, the system may query the HSM during the key creation process to determine how many key parts are currently combined or if the key is complete, thus providing the user with information about the key creation process.

The discussion below relates to an exemplary secure system, such as system 100 (FIG. 1), for creation and management of multiple key parts and how the system is used to make a complete key. In an embodiment, the system 100 includes a secure module, such as an HSM, in the host system 106. The HSM in the host system 106 is configured to create and/or assemble key parts into a complete key using the methods and systems described herein with reference to FIG. 7. When the HSM creates a key in a token from key parts, the HSM verifies and updates information relating to the key parts, assembly of the key parts and completion of the key, wherein this information is bound to the key (while either partially or fully assembled) as key control information. Exemplary systems and methods may use any suitable data structure, token and/or hardware to provide a binding between the secure key and the key creation and assembly information, wherein the information is updated within an HSM. For ease of explanation, the method and system below will be described with reference to the token of FIGS. 2-6, although it should be noted that any suitable structure or token configuration may be used.

In an exemplary assembly method 700, the HSM is configured to verify and populate key management fields (KMFs) 524 in the token (within Application Data 500 or "key control information" section) with information related to the minimum number of required key parts and key completeness (i.e., whether the key is complete and ready for use). During a step 702, an initialization value for the number of the key parts is securely inserted (shown by arrow 704) into the KMF 524 by a first user via the HSM. The minimum number of key parts may be entered into a counter in the KMF 524. In the embodiment, the counter may iterate by counting down as key parts are added by other users. For example, in a decrementing counter, input 704 (also called "initialization input") is a value of "3" indicated by two binary digits "11" for a key comprised of a minimum of three key parts. Since the counter information indicates that three key parts are needed and this is the first step, the value "3" (binary 11) also indicates that the first part is currently in the token. In addition, the step 702 includes populating the payload 600 with the first key part provided to the HSM by a first user. In embodiments, the key parts are either clear key parts (i.e., not encrypted) or encrypted key parts, wherein the parts may be unencrypted and/or assembled securely within the HSM. Any suitable indicator may be used to store the number of key parts, such as a pair of binary bits in the KMF 524 set to a value corresponding to the number of parts. Further, a counter in the KMF 524 may also iterate (up or down) for each key part added to the token. By having the information relating to the total number of key parts and number of key parts currently combined (in KMF 524) securely bound to the key in the token 200, the method 700 provides secure control of key creation and assembly in the HSM.

In a step 706, the information related to the minimum number of required key parts and number of key parts currently in the token may be stored in the KMF 524 from step 702, as shown by an input 708. In an embodiment with three or more key parts, the number of key parts is established in a prior step, such as step 702. Further, in the embodiment, the HSM accesses the stored KMF 524 information when a second user inputs a second key part, thereby iterating the value for number of key parts currently in the token to indicate two key parts are combined in the payload 600. In an embodiment that stores the number of parts as a decrementing counter, the counter represents the number of parts combined in addition to functioning as value to indicate the minimum number of key parts initialized by a first user (i.e. in step 702). In addition, the decremental counter provides an indication if the key is complete when the counter reaches "0" (i.e. a zero value), thus providing a completeness indicator.

In an exemplary embodiment where the key is created from three parts, the decremental counter iterates from "3" (binary digits 11) to "2" (binary 10) during step 706 to indicate that 2 parts are combined and that the key is not complete. In the example, the counter indicates that the key is complete with a value of "0" (binary 00), wherein a last completion step iterates the counter but does not provide a key part, as will be described below. In an embodiment with three key parts and an incremental counter, the counter iterates from "0" to "1" (binary 00 to 01) in step 706 to indicate that two key parts have been combined. Further, a separate value in the KMF 524 is used to identify when the key is completed. In the three key part example, the second value is "3" (binary 11), wherein the counter value is checked against this completion value after each counter iteration, thereby providing a complete indication when the values are equal. In another embodiment, an incremental counter may be used where the key completing or final user may access the token via the HSM to change a completeness indicator to indicate key completion, such as changing a bit from 0 to 1. Thus, the decremental counter embodiment simplifies the mechanism in the KMF 524 by using a single value to indicate the number of key parts combined and the key completion status.

As discussed herein, the method and system for securely creating keys made from one or more parts may be utilized for as many key parts as desired (e.g., 10 or 1,000,000 key parts) and as a few as one key part, depending on the application. The exemplary method 700 provides a process for creating a key from a minimum of three key parts, however the same process may be utilized for creating a key from any minimum number of key parts. In addition, in an embodiment, the users who enter the three separate key parts (parts 1-3) are each authorized only to enter their own particular key part, so that multiple control is enforced for entry of key parts. In an example user A is only allowed to enter key part 1, user B is only allowed to enter key part 2 and user C is only allowed to enter key part 3, wherein the system will not allow user A to enter key part 2 or 3. With reference to step 706, input 710 represents an initialization value for a key created from two parts, wherein the step 702 is not used. Thus, the initialization input 710 represents the minimum number of key parts to create the key. Further, the HSM places the key part from the user in the payload 600 during step 706. In the two key part embodiment with a decrementing counter, a single value of "2" (bits 10) is the counter value for initialization input 710.

Figure 7:
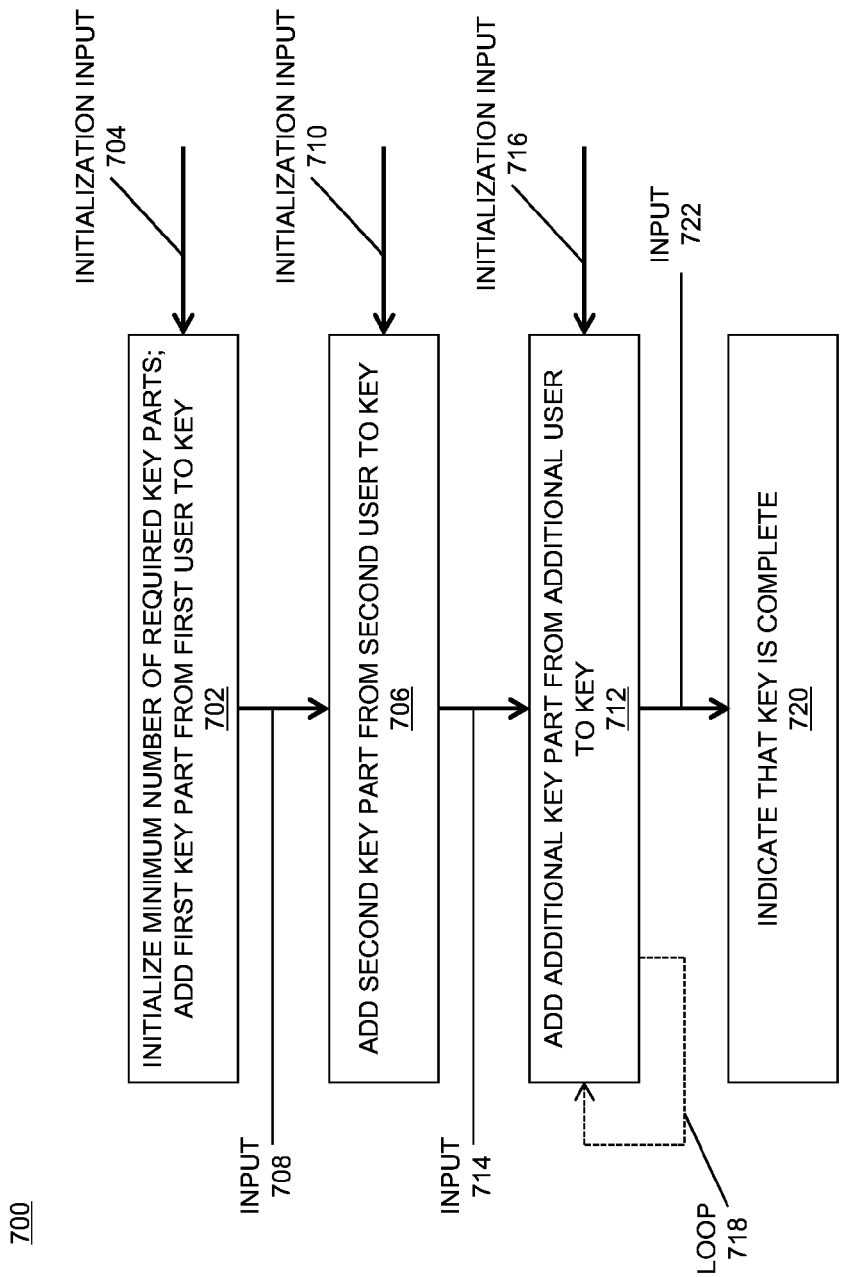
FIG. 7 depicts an exemplary method for creating a secure key.

Still referring to FIG. 7, in a step 712, the KMF 524 stores the minimum number of key parts and number of key parts currently combined, wherein the stored values are received as an input 714 from step 706. Accordingly, in an embodiment with a key comprised of three parts, a third user inputs a third key part to the payload 600 via the HSM while the counter iterates to indicate that three key parts have been combined in the payload. In another embodiment where a single key part is used to make up the entire key, input 716 represents an initialization value for number of key parts, wherein steps 702 and 706 are not utilized. The input 716 (also called "initialization input") represents the minimum number of key parts and indicates the number of key parts currently combined (e.g., one part) in the payload 600. An optional loop 718 allows the user in step 712 to repeatedly add key parts to the payload without affecting the counter value, prior to completion step 720. This loop 718 provides one way of allowing additional key parts, such as greater than three key parts, to be combined without expanding the size of the counter beyond two bits.

The completion step 720 receives the value for number of key parts in the payload 600 from step 712 via the input 722. In the completion step 720, a final user provides no key parts or information, but changes to the key completeness indicator to complete, thereby allowing the key to be used. Thus, the step 720 adds a dual control aspect to the method 700 with the additional layer of security requiring input from the final user. In the decremental counter embodiment of method 700, the step 720 receives a value of "1" (bits 01) and iterates or changes the value to "0" (bits 00) within the HSM when the final user accesses the system. The "0" value indicates the key is complete and ready for use. In the incremental counter embodiment, access by the final user may cause the counter to iterate and be compared to a completion value to determine if the key is complete. Alternatively, access by the final user may cause a completeness indicator value, separate from the counter, to change to show that the key is complete and ready for use.

Thus, exemplary method 700 for creating a key from a plurality of key parts using a decremental counter is shown in the following exemplary table.

TABLE 1

| Step | User | Key Part Added | Binary Counter Value | Key Complete? |
|---|---|---|---|---|
| 1 | first user | first key part | 1...1 | No |
| ... | ... | ... | ... | No |
| N − 1 | N − 1 user | N − 1 key part | 01 | No |
| N | Nth user | N/A | 00 | Yes |

As compared to FIG. 7, step 1 of the exemplary Table 1 compares to step 702. In addition, step N-1 compares to step 712 and step N compares to step 720.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for creating a secure key in a host system, comprising:
    creating a token in a memory of the host system by a processor of the host system;
    populating a key control information section of the token with a key part counter value to indicate a minimum number of key parts from separate users that are required to form a key, wherein each key part is controlled by a respective separate user, each key part is necessary to complete the key, and the information in an individual key part cannot be used to determine any part of a complete key;
    populating a payload section of the token with a first key part from a first user;
    binding the key control information section to the payload section of the token;
    adding a second key part from a second user, the second user being distinct from the first user, to the first key part and incrementing or decrementing the key part counter value based on the addition of the second key part to the first key part;
    binding, by the host system, the key control information section to the payload section of the token after the second key part has been added to the key; and
    indicating, by the host system, the key is complete based on the incremented or decremented key part counter value in the token, wherein the completed key comprises a combination of the first and second key parts.

2. The method of claim 1, wherein indicating the key is complete is performed based on the decremented key part counter value being equal to a zero value, wherein the key part counter value comprises a decremental counter, and wherein the decremented key part counter value being equal to the zero value comprises a completeness indicator for the completed key.

3. The method of claim 1, wherein the key control information section comprises a key management field with the value and an indicator of completeness, wherein the value comprises an incremental counter.

4. The method of claim 1, wherein binding the key control information section to the payload section comprises securely binding the key control information section to the payload section that comprises the key and a hash of the key control information section.

5. The method of claim 1, comprising:
    adding a third key part from a third user, the third user being distinct from the first and second users, to the first and second key parts and incrementing or decrementing the value based on the addition of the third key part to the first key part and the second key part;
    binding the key control information section to the payload section of the token after the third key part has been added to the key; and
    indicating the key is complete based on the incremented or decremented key part counter value in the token, wherein the completed key comprises a combination of the first, second and third key parts.

6. The method of claim 1, wherein populating the key control information section of the token with the value comprises populating the key control information section with a value for minimum number of key parts.

7. The method of claim 1, wherein populating the key control information section of the token with the value comprises populating a counter having two bits.

8. The method of claim 1, wherein the steps of populating the key control information section, populating the payload section, binding the key control information section, adding the second key part and binding the key control information section to the payload section after the second key part has been added each occur within a secure hardware module.

9. The method of claim 1, wherein wherein the indicating is the key is complete is performed based on a final user, the final user being distinct from the first and second users, accessing the token.

10. The method of claim 1, wherein indicating the key is complete is performed based on the incremented key part counter value being equal to a total number of key parts, wherein the key part counter value comprises an incremental counter, and further comprising setting a completeness indicator for the completed key based on the incremented key part counter value being equal to the total number of key parts.

\* \* \* \* \*